Feb. 15, 1955 R. J. WAGNER ET AL 2,702,336
COOKING APPARATUS
Filed June 12, 1951 7 Sheets-Sheet 1
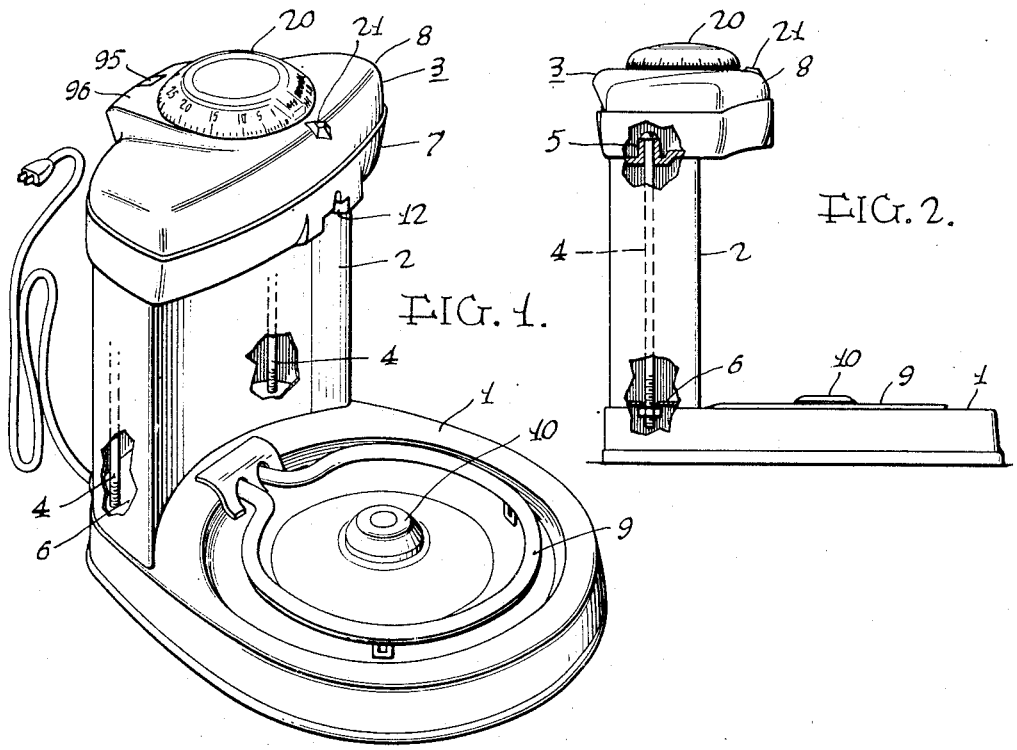
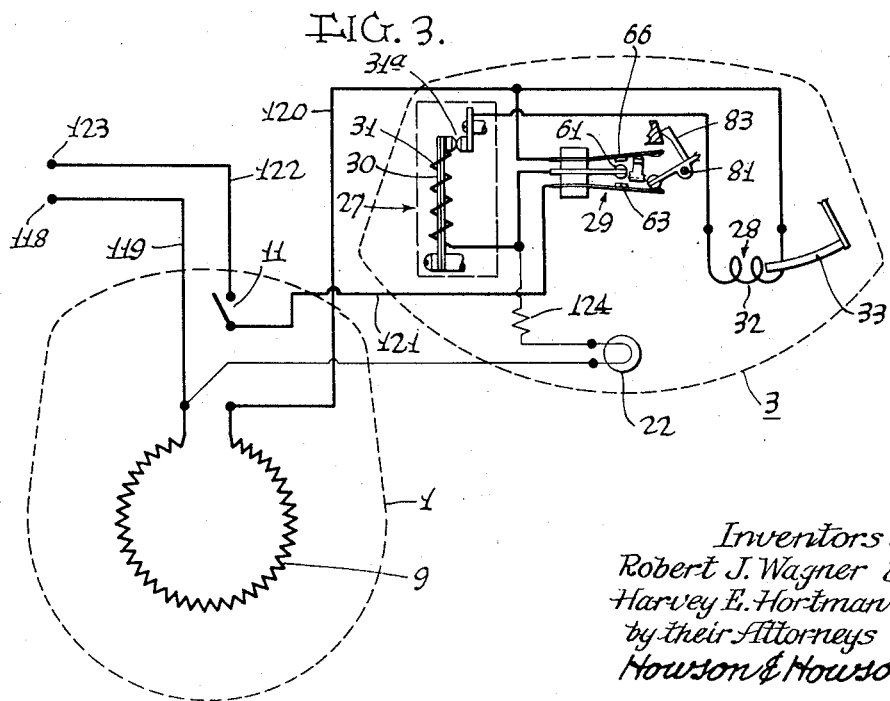
Inventors:
Robert J. Wagner &
Harvey E. Hortman Jr.,
by their Attorneys
Howson & Howson

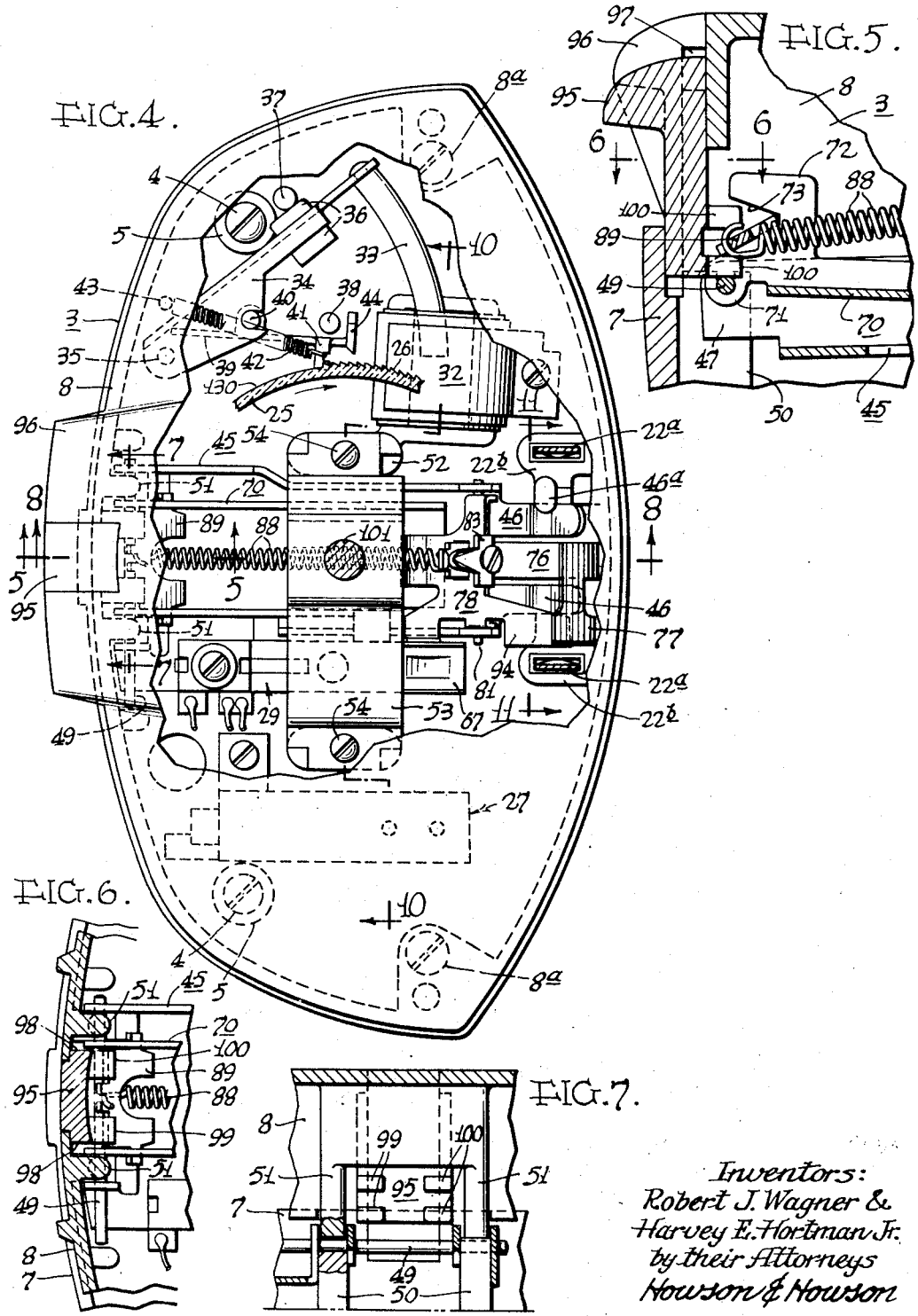

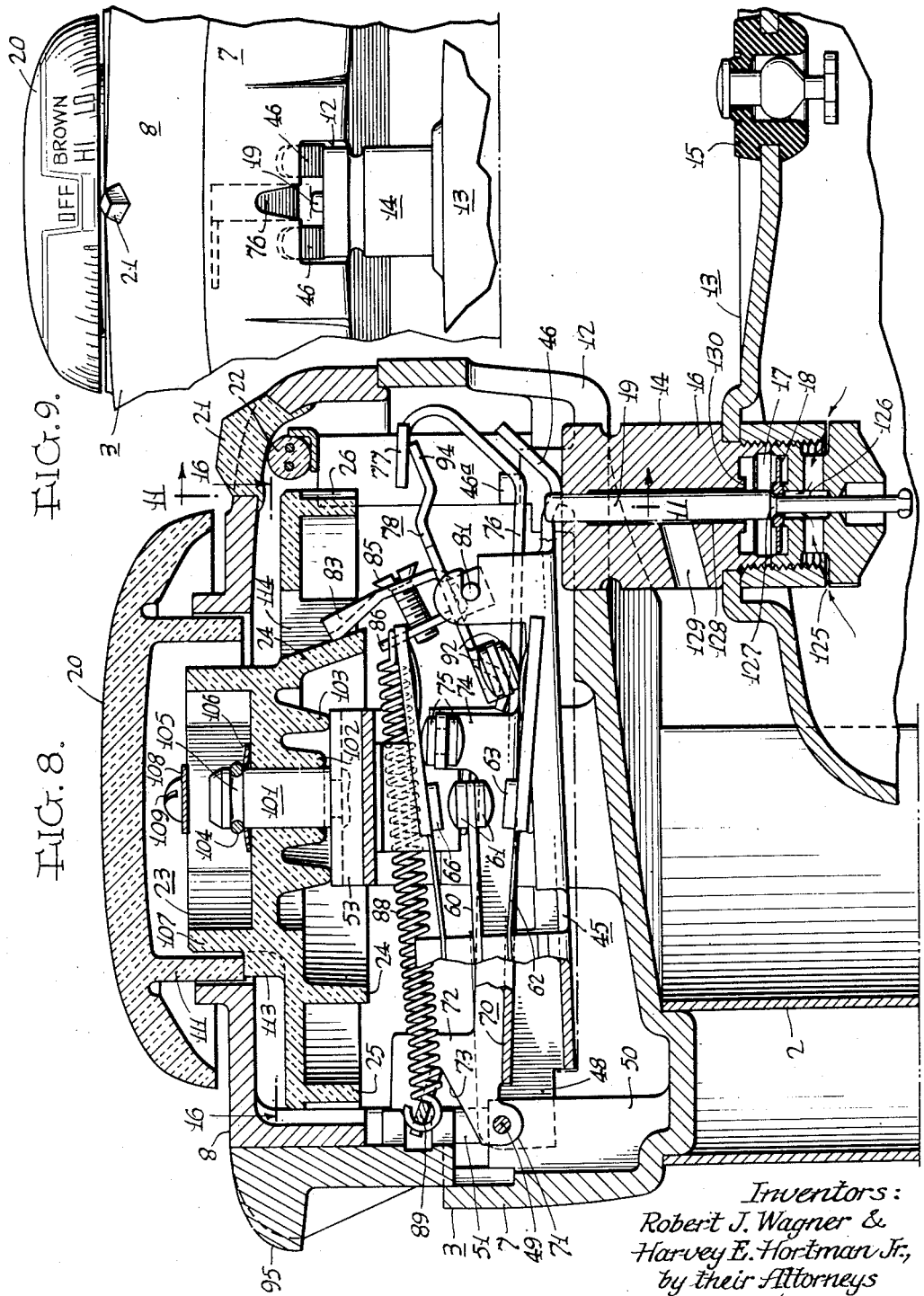

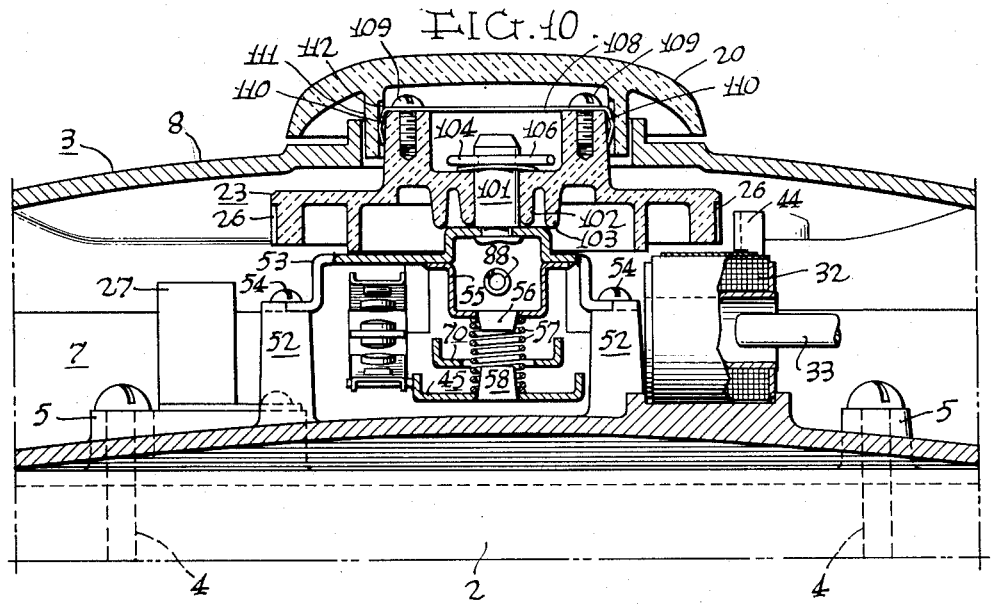
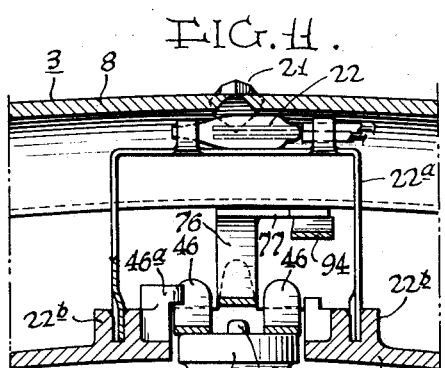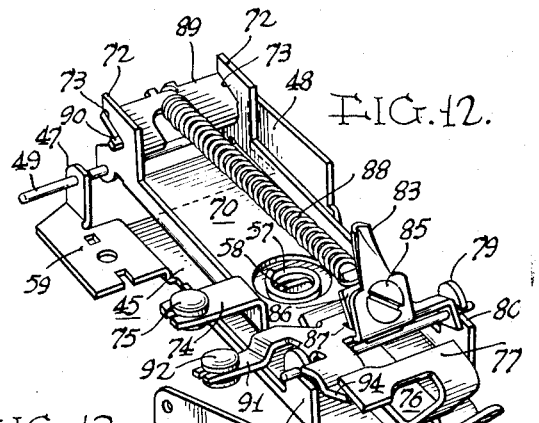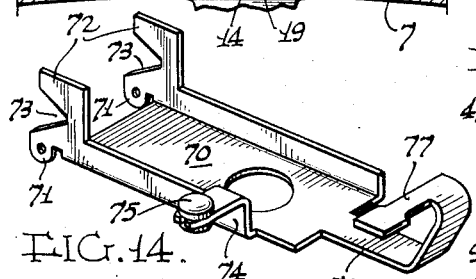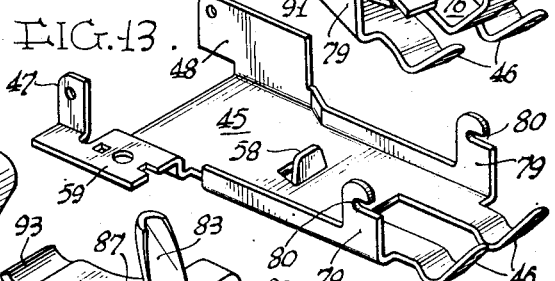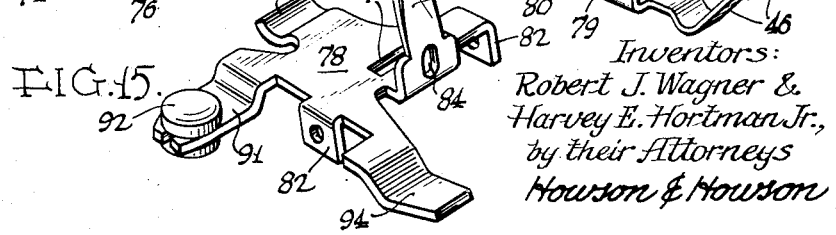

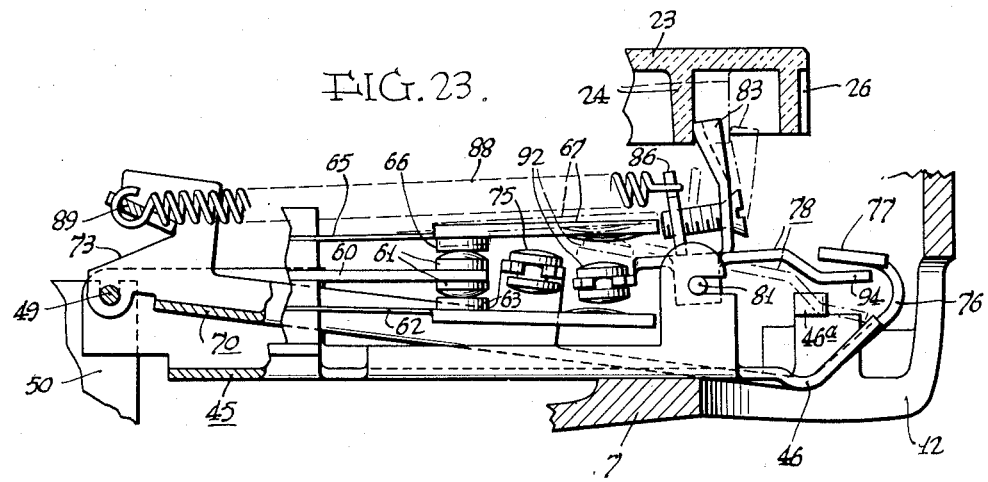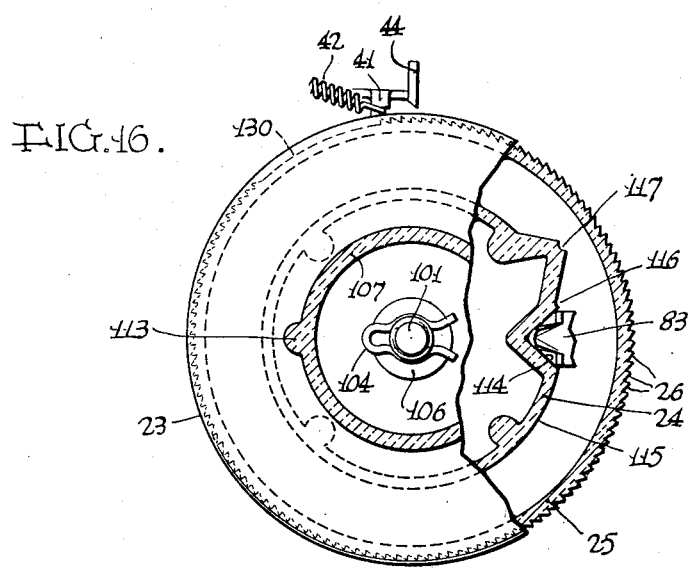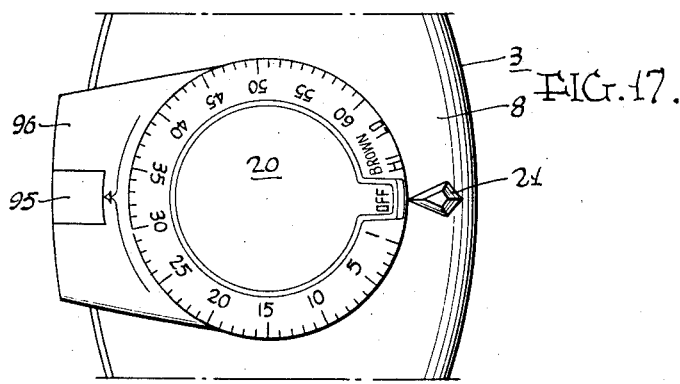

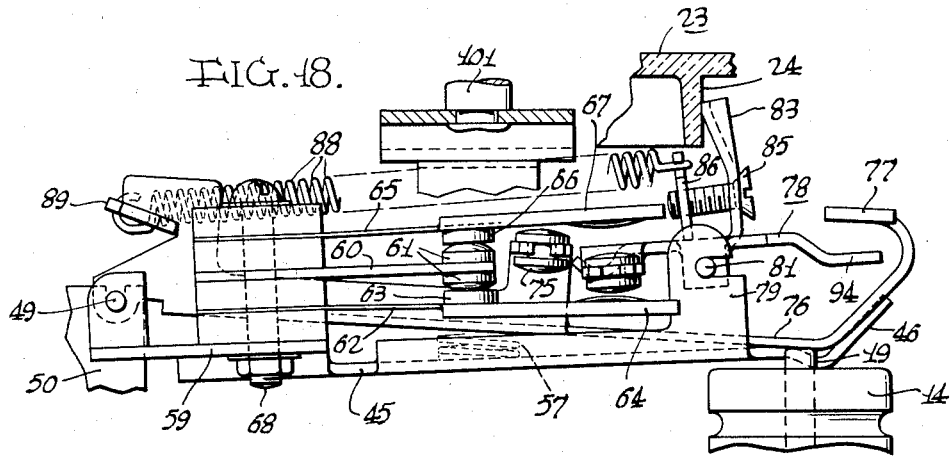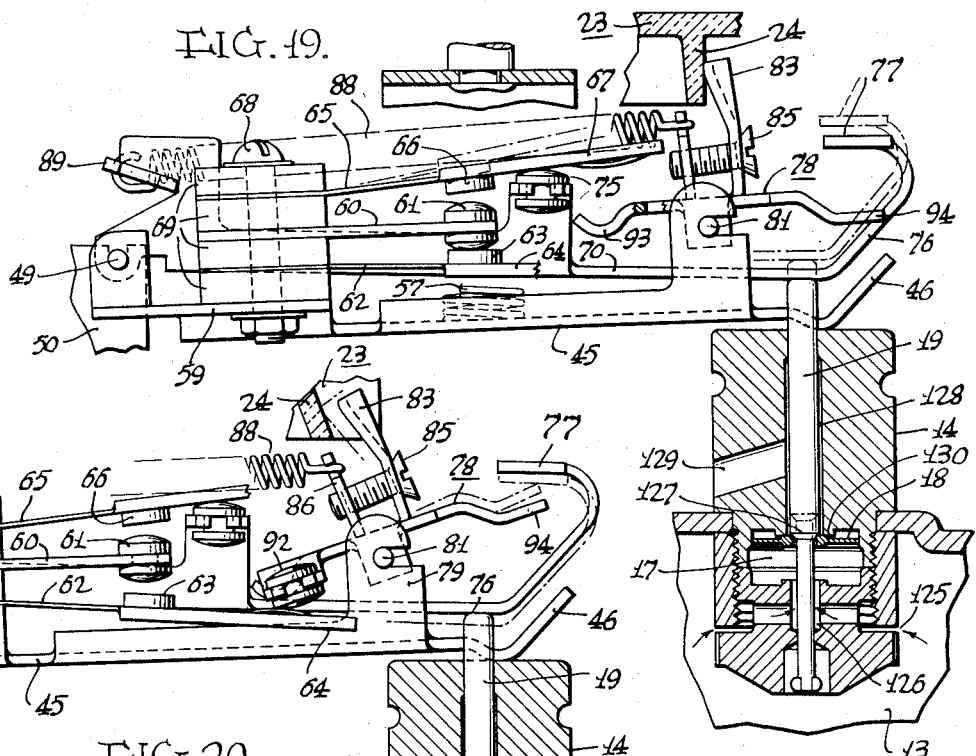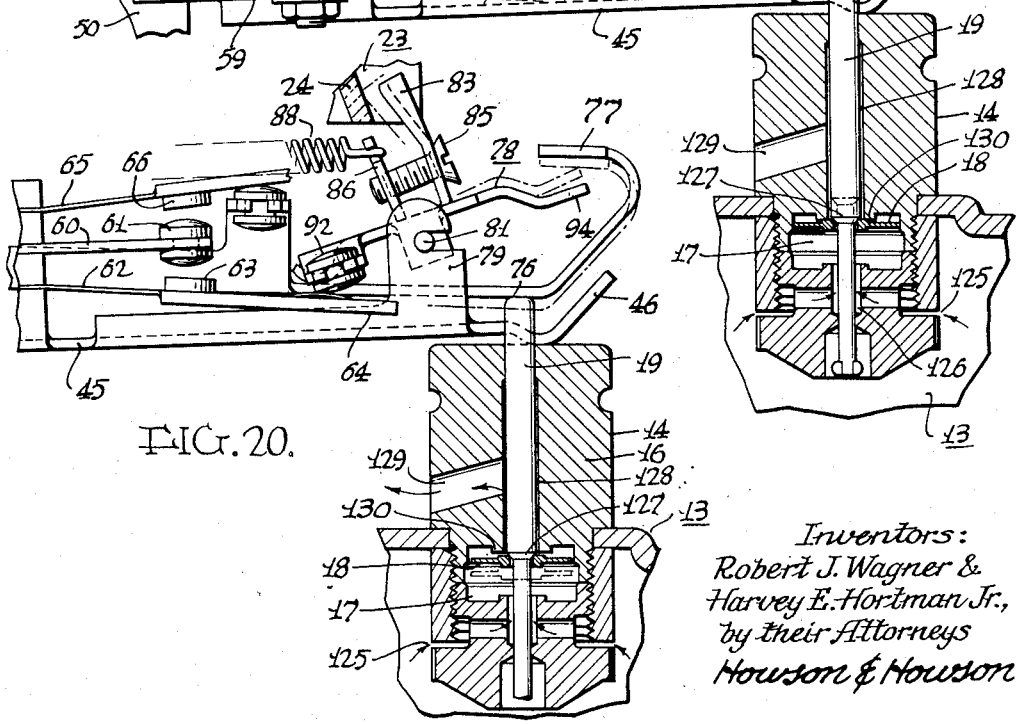

Inventors:
Robert J. Wagner &
Harvey E. Hortman Jr.,
by their Attorneys
Howson & Howson

United States Patent Office 2,702,336
Patented Feb. 15, 1955

2,702,336

COOKING APPARATUS

Robert J. Wagner, Philadelphia, and Harvey E. Hortman, Jr., Southampton, Pa., assignors to Proctor Electric Company, Philadelphia, Pa., a corporation of Pennsylvania Application June 12, 1951, Serial No. 231,224

27 Claims. (Cl. 219—43)

This invention relates to heating and control apparatus for the operation of cooking devices. Primarily the invention relates to apparatus for automatic operation and control of a pressure cooker, although the apparatus provided according to the invention may be utilized for non-automatic operation of a pressure cooker and may also be utilized with an ordinary cooking vessel.

The principal object of the invention is to provide an improved and commercially practical apparatus utilizing the concept and teaching of the invention disclosed and claimed in the Turner et al. U. S. Patent No. 2,641,680, issued June 9, 1953. In that patent there is disclosed an apparatus for automatic control of a pressure cooker, which apparatus embodies certain desirable features for automatic pressure cooking. Among such features are: Automatic reduction of the heat supply after initial full rate heating of the pressure cooker to bring the same rapidly to the desired cooking pressure; automatic commencement of timing of the cooking operation simultaneously with the reduction of the heat supply; and automatic deenergization of the heat supply means, and simultaneous automatic venting of the pressure cooker, at the end of a timed interval for which the apparatus was set. In the apparatus disclosed in the Turner et al patent there is a control stand comprising a horizontal base to receive the cooking vessel, and a vertical column or tower extending upward from the base. The base is provided with an electric heating unit and both the base and the vertical tower serve to house the control mechanism.

As indicated above, the apparatus provided by the present invention is a commercial adaptation of the broader invention disclosed in the Turner et al. patent.

One object of this invention is to provide an apparatus which is of simplified general construction and which represents a substantial improvement from the standpoints of commercial manufacture, efficiency of operation, and ease of use.

Another object of this invention is to provide in such apparatus novel and advantageous control mechanism.

A further object of the invention is to provide a novel and desirable arrangement and organization of the component devices of the apparatus.

Still another object of the invention is to provide in such apparatus for selectability of different operating pressures.

In the apparatus according to this invention, the control devices are brought together within a hollow head provided in the top of the vertical tower or standard which extends upward from the base. Aside from supporting the control head, the tower serves merely to house electrical conductors extending from the control devices to the heating unit on the base. Within the control head is a novel feeler and switch mechanism which is pressure actuated from a controlling valve on the pressure cooker. Also on the control head is a manually adjustable knob or dial by which the apparatus is set into operation and the desired cooking time is set.

Reference is now made to the accompanying drawings, wherein

Figs. 1 and 2 are small scale perspective and side elevational views respectively of the apparatus, with portions of the casing broken away to show the mechanical connecting elements;

Fig. 3 is a diagrammatic illustration showing the electrical connections;

Fig. 4 is a plan view of the control head with the casing broken away to disclose certain of the parts;

Fig. 5 is a fragmentary sectional view taken along line 5—5 of Fig. 4, showing the pressure selector element in the position for the lower pressure value;

Fig. 6 is a fragmentary sectional view taken along line 6—6 of Fig. 5;

Fig. 7 is a fragmentary sectional view taken along line 7—7 of Fig. 4;

Fig. 8 is a sectional view taken centrally through the control head along line 8—8 of Fig. 4, and through a portion of a pressure cooker associated with the apparatus;

Fig. 9 is a fragmentary elevational view taken from the right side of Fig. 8;

Fig. 10 is a fragmentary sectional view taken along line 10—10 of Fig. 4;

Fig. 11 is a fragmentary sectional view taken along line 11—11 of Fig. 8;

Fig. 12 is a perspective view of the feeler and switch assembly;

Figs. 13 to 15 are perspective views of the principal parts of said assembly;

Fig. 16 is a sectional view taken along line 16—16 of Fig. 8;

Fig. 17 is a fragmentary plan view showing the dial marking;

Figs. 18 to 20 are operational views showing different stages in the operation of the feeler and switch mechanism;

Fig. 23 is an operational view showing the condition of the parts during non-automatic operation.

Figure 21:
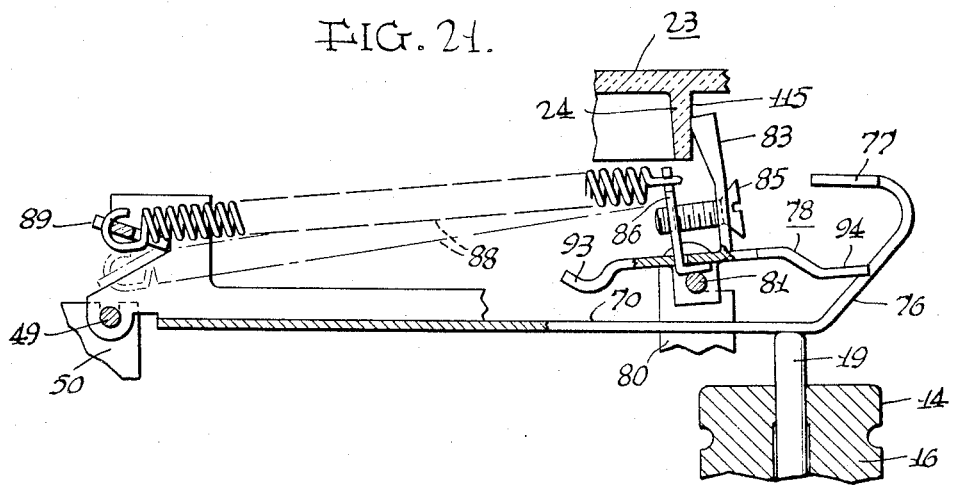
Figs. 21 and 22 are simplified illustrations of the operation of certain elements of the mechanism.

Referring first to Figs. 1 and 2, the apparatus provided by the invention comprises a stand as shown including a base 1, a standard 2 extending vertically upward therefrom, and a hollow head 3 at the top of the tower. The base 1 and standard 2 are preferably formed of sheet metal, while the head 3 is preferably formed of molded non-metallic parts, e. g. Bakelite or the like. The several parts of the stand may be secured together by long bolts 4 extending vertically within the standard 2. In the form shown, the head ends of the bolts extend through bosses 5 of the head 3, while the lower ends of the bolts extend through apertures in the upper wall 6 of the base. The head 3 comprises detachable parts 7 and 8, permitting insertion of the bolts 4, and the base 1 has a removable bottom to enable tightening of the nuts on the bolts. The lower part 7 is fixedly secured at the top of standard 2 by the bolts 4. The upper part 8 is removably secured to part 7 by means of screws 8a which extend upward through holes in part 7 and threadedly engage portions of part 8. Removal of the upper part 7 exposes the entire mechanism contained within the head, as hereinafter described.

The base 1 is provided with an electrical heating unit 9 which is preferably of ring shape as shown, and which is adapted to receive a pressure cooker vessel. Also provided on the base 1 is a switch device adapted to be actuated by the weight of the cooker vessel and which includes an upwardly extending member 10, as shown in Figs. 1 and 2, said member being spring-biased upward for positive engagement with the bottom of the cooker vessel when the latter is placed on the heating unit 9. The said device includes a switch 11 (see Fig. 3) which is normally open and which is closed by the weight of the cooker vessel, so that the circuit of the apparatus is closed only when a cooker vessel is placed on the heating unit 9. The present invention is not concerned with the weight-operated switch device, nor with the details of mounting of the heating unit 9 on the base 1. This structure is set forth in our U. S. Patent No. 2,660,658, issued November 24, 1953.

The lower part 7 of the head 3 has an opening 12 which is adapted to receive the upper part of the control valve 14 of a pressure cooker 13, as may be seen in Figs. 8 and 9, in order that the control valve and the mechanism within the head 3 may cooperate to perform the desired functions as hereinafter described. The opening 12 has side walls and a rear wall which not only locate the valve but also index the position of the pressure cooker on the base of the stand. The pressure cooker is of the usual type having a removable lid. As may be seen in Fig. 8, the pressure cooker 13 is also preferably provided with an air venting and pressure indicating device 15, the latter being of the character disclosed and claimed in U. S. Patent No. 2,670,755, issued March 2, 1954 to W. S. Kendrick. With respect to device 15, it suffices to note that it serves to vent the air from within the pressure cooker vessel during the preliminary heating and then creates a seal to maintain pressure within the vessel, and this device also functions as a safety release valve in the event that dangerously excessive pressure develops within the vessel. The present invention is not at all concerned with this device.

The control valve 14 is a multi-purpose device, being adapted to effect switching operation, to relieve excess pressure within the vessel, and to be actuated for automatic venting at the end of the cooking operation, as hereinafter described. The valve is shown as comprising a multi-part casing 16 affixed to the pressure cooker lid and forming an interior chamber 17, a pressure operable disc 18 freely disposed with the chamber 17, and a stem-like valve element 19 movably disposed within the valve casing and extending upwardly therefrom. The valve is of the type disclosed and claimed in U. S. Patent No. 2,667,891, issued February 2, 1954, to John H. Hilldale. The operation of the valve in cooperation with the control apparatus of the present invention will be described later.

Referring to Figs. 1, 2, 8 and 17, the head 3 is provided with a rotatably adjustable knob or dial 20 which has time-indicating indicia thereon cooperative with a pointer 21 which is in the form of a translucent window beneath which is a pilot lamp 22 for illumination of the pointer 21. As shown in Fig. 11, the pilot lamp 22 is supported by an arch-shaped support 22a whose legs seat in recessed bosses 22b formed integrally with the lower part 7 of head 3. In operation as hereinafter described, the dial 20 is set according to the desired length of time for pressure cooking operation, and during the timed cooking operation the knob is returned to its "off" position in a step-by-step movement. Operatively associated with the dial 20, as hereinafter more fully described, is a control member 23 (Figs. 10 and 16) having concentric depending flanges 24 and 25. The inner flange 24 is formed to serve as a controlling cam, as hereinafter described, while the outer flange 23 has peripheral ratchet teeth 26 thereon (see Fig. 16) by which the entire rotatable unit, including the dial 20, is moved in step-by-step fashion during the timed cooking operation.

Referring now to Figs. 3 and 4, the mechanism within the control head 3 comprises three principal devices. These comprise a thermally operable switch device 27, a solenoid pawl-actuating device 28, and a feeler and switch mechanism 29, these several devices being disposed within the head 3 as shown and being mounted on the lower part 7 of the control head.

It should be noted here that the apparatus provided by the present invention is similar to that disclosed in the above-mentioned Turner et al. Patent No. 2,641,680, in that it utilizes a thermal make-and-break switching device and a solenoid intermittently energized thereby, and the timing operation is performed by means of a ratchet device actuated by the solenoid. The said switching device also serves to reduce heat output of the heating unit 9, as hereinafter described.

The thermally operable switch device 27 may be of the same form as that shown in the Turner et al patent. Such device comprises a bimetallic member activated by an associated electrical heater, and a snap acting switch controlled by the bimetallic member. In the diagrammatic illustration of Fig. 3, the bimetallic member is represented at 30, the heater is represented at 31, and the switch is represented at 31a. Since the present invention is not concerned with the physical structure of this thermal switch device, further illustration and description thereof are unnecessary.

The solenoid mechanism 28 comprises the coil or winding 32, and the movable armature 33. As may be seen in Fig. 4, the armature 33 is secured to the free end of an arm 34 which is pivoted at 35. The arm 34 forms part of a ratchet-actuating mechanism which forms the subject of a copending application of Robert Wagner, Serial No. 231,223, filed June 12, 1951. For the purpose of the present application, only brief description of this mechanism is necessary. The arm 34 carries a rubber block 36 which serves to cushion shock and which is engageable with fixed stop pins 37 and 38 formed integrally with the base of the head 3. A lever 39 is pivotally supported by arm 34 at 40. This lever has an extension 41 to which one end of a helical extension spring 42 is secured, the other end of the spring being secured to a fixed pin 43. Lever 39 is formed at its end to provide a pawl 44 which is engageable with the ratchet teeth 26 hereinbefore mentioned. Normally, with the solenoid winding 32 deenergized, the parts are disposed as shown in Fig. 4 under the influence of spring 42, and it will be noted that the longitudinal axis of the spring is on one side of the center of pivot 40. When the solenoid winding 32 is energized, arm 34 is rotated about its pivot 35, and the pawl 44 is brought into engagement with one of the teeth 26. This causes movement of the rotatable unit comprising the control member 23 (Fig. 8) and the dial 20. At the same time, the relative positions of arm 34 and spring 42 are so changed that the axis of the spring shifts to the other side of the center of pivot 40. When this happens, the pawl 44 is abruptly disengaged from the teeth 26. Thus the mechanism comprises a spring toggle arrangement by which the pawl 44 is caused to operate the associated ratchet a predetermined amount each time the solenoid winding 32 is energized. As stated above, this mechanism forms the subject of a copending application, to which reference may be had for a more complete description.

Referring now to the feeler and switch mechanism 29, as shown in Fig. 4, this mechanism is located centrally of the head 3. This mechanism comprises cooperative feeler and switch elements mounted as a unitary assembly. Referring particularly to Figs. 12 to 15 there is provided a bottom plate 45 having a pair of extending fingers 46, and also having tabs or extensions 47 and 48 through which a pivot or hinge pin 49 extends. As may be seen in Fig. 7, the pin 49 seats in recesses of supporting blocks 50 formed integrally with the lower part 7 of the head casing. Pin-like extensions 51 formed integrally with the upper part 8 of the head casing serve to hold the pin 49 in its seating recesses when the casing parts are assembled. As may be seen in Figs. 4 and 8, the pivot pin 49 is located at the rear of the casing, and the fingers 46 project forwardly into the opening 12 which serves to accommodate the control valve of a pressure cooker vessel, as hereinbefore mentioned. The purpose of the fingers 46 is to engage the top of the valve body or casing as may be seen in Figs. 8 and 9, in order that the entire feeler and switch mechanism will adjust itself according to the height of the valve.

As may be seen in Figs. 4 and 10, a pair of spaced supporting pillars 52 are formed integrally with the floor of the head casing, and a rigid yoke 53 extends between these pillars and is secured thereto by means of screws 54. As shown in Fig. 10, a U-shaped member 55 is secured to yoke 53, by being welded thereto, and this member has a tab 56 turned downwardly therefrom to seat the upper end of a helical compression spring 57. The lower end of the spring seats over a tab 58 turned upwardly from the plate 45. Since the upper end of the spring 57 is fixed, the spring exerts downward pressure on the hinged plate 45. When the fingers 46 engage the controlling valve of a pressure cooker as shown in Fig. 8, plate 45 is raised slightly against the action of spring 57. The upward movement of plate 45 is limited by a stop 46a (Figs. 4, 8 and 11) formed integrally with the lower part 7 of head 3.

The side extension 59 (Figs. 12 and 13) on plate 45 serves to support a switch assembly as may be clearly seen in Fig. 18. The switch assembly comprises a rigid central arm 60 carrying a contact 61, a lower spring arm 62 carrying a contact 63 and having a rigid extension 64, and an upper spring arm 65 carrying a contact 66 and having a rigid extension 67. The three switch arms are mounted on the plate extension 59 by means of a bolt 68 and are insulated from one another by means of stacked insulators designated generally by reference numeral 69.

Referring again to Figs. 12 to 15, a second plate or lever 70 is disposed above plate 45 and is provided with apertured ears 71 through which the pivot pin 49 extends. Thus this second plate is mounted on the same pivot as is the first plate 45. The mounting ears 71 form with associated extensions 72 a pair of V-shaped recesses 73 whose purpose will appear presently. As may be clearly seen in Fig. 14, the plate 70 also has extension 74 which carries an insulating button 75, the latter being adapted to actuate the upper switch blade as hereinafter described. Plate 70 also has a forward extension 76 which terminates in a transverse finger 77, the purpose of which will appear presently.

As also shown in Figs. 12 to 15, an actuator member or lever 78 is pivotally mounted at the forward portion of plate 45. To this end, plate 45 is provided with upwardly extending tabs 79 having recesses 80 to accommodate a pivot pin 81. The actuator member 78 has downwardly turned apertured tabs 82 through which the pin 81 extends. Member 78 also has an upwardly turned finger 83 having an aperture 84 to accommodate a screw 85 which threadedly engages a small plate 86 (see Fig. 8). The plate 86 extends through a slot 87 in member 78 and its lower edge is turned beneath said member. The upper part of this small plate is formed for securement thereto of one end of a helical tension spring 88 whose other end is secured to an element 89 (Fig. 12) having projections 90 which seat in the V-shaped recesses 73. The assembly of plate 86 in slot 87 and the arrangement of screw 85 permit member 78 and plate 86 to act as one element while providing for adjustment of the tension in spring 88. The purpose of element 89 will be described presently.

As may be seen in Figs. 12 and 15, the actuator member 78 is provided with an extension 91 which carries an insulating button 92 for actuation of both the upper and lower switch blades as hereinafter described. Member 78 also has an extension 93 for engagement with plate 70, and it also has an extending finger 94 which is engageable with the transverse finger 77 on plate 70.

As will be seen from the subsequent description, the desired operating pressure of the cooker and the various functions which act to effect and maintain this pressure are dependent upon the moment of force of spring 88 about pivot 49 and the resulting force exerted on the valve stem 19. One of the features of the present invention is the provision of an arrangement whereby such moment of force may be changed from one value to another to select one of two different operating pressures. As described above, the rear end of spring 88 is secured to element 89 (Fig. 12) which seats in the V-shaped recesses 73. The element 89 is movable between two positions in said recesses, fulcruming about an axis extending between the vertices of the V-shaped recesses, as may be seen in Figs. 5 and 12. Such movement of the element 89 shifts the point of application of the tension of spring 88 and changes the above-mentioned moment of force from one value to another. When element 89 is in its upper position, as shown in Fig. 12, the force moment has the greater value, and when said element is in the lower position, as shown in Fig. 5, the force moment has the smaller value.

The element 89 is manually movable between its two stable positions by means of a slide member 95, the details and mounting of which may be seen in Figs. 4 to 8. As may be seen in Figs. 4 and 5, the upper part 8 of head 3 has a protuberant portion 96 which is centrally channeled to accommodate the slide member 95. At each side of said channel is a retaining and guide recess 97 which slidably retains a side flange 98 formed on the slide member 95. At the bottom of member 95 are two pairs of inwardly projecting fingers 99 and 100 within which element 89 extends. As the slide member 95 is moved upward or downward, the said fingers serve to rock element 89 about its fulcrum as described above. When member 95 is in its upper position, as shown in Fig. 8, it is set so that the cooker will operate at the higher pressure, e. g. 15 lbs., and when said member is in its lower position, as shown in Fig. 5, it is set so that the cooker will operate at the lower pressure, e. g. 10 lbs.

Referring now to Figs. 8, 10 and 16, the yoke 53, hereinbefore described, supports a stationary upwardly extending stud 101, the stud being secured to the yoke in any suitable manner, e. g., by the rivet connection as shown in Fig. 10. The stud 101 serves to rotatably support the controlling member 23 hereinbefore mentioned, the latter being centrally apertured to fit over the stud. As may be seen in Figs. 8 and 10, member 23 is preferably provided with depending concentric flanges 102 and 103. The inner flange 102 provides greater bearing surface in conjunction with the stud 101, while the outer flange 103 bears against the yoke 53 and thus supports member 23 for rotation about the stationary stud 101. Member 23 is held on the stud 101 by means of a hairpin fastener 104 seated in a groove 105 of the stud 101 and bearing against a spring washer 106. The spring washer provides a predetermined loading of flange 103 against yoke 53 to thereby provide a controlled amount of frictional resistance to rotation of member 23. It will be appreciated that the rotation is also resisted by the friction imparted by finger 83 of actuator 78 on cam race 24.

The structure by which the dial 20 is attached to member 23 and is indexed with respect thereto is similar to that disclosed and claimed in U. S. Patent No. 2,667,084, issued July 1, 1953, to William MacNamara. Referring to Figs. 8 and 10, member 23 is formed to provide an upwardly extending wall 107 which serves to support a transverse spring metal band 108, as by means of screws 109 which extend thru elongated holes 108a therein. As may be seen in Fig. 10, the ends 110 of band 108 are turned downwardly and are outwardly bowed. The purpose of this is to frictionally support the dial 20. The latter has a depending circular flange 111 which is provided with diametrically opposed internal recesses 112 in which the bowed end of band 108 may snugly fit. This arrangement not only serves to frictionally hold the dial 20 in connection with the controlling member 23, but it also serves to index the dial in proper relation to said member thru the elongated holes 108a therein. Further, as may be seen in Figs. 8 and 10, member 23 is provided with a number, i. e. three, of seating projections 113 upon which the flange 111 of dial 20 may seat.

As previously mentioned, the cam flange 24 of member 23 serves to control the operation, and it may now be seen that it does so by engagement with the upwardly projecting finger 83 of actuator member 78. Fig. 16 shows the shape or formation of the cam flange 24 by virtue of which it is adapted to serve the desired purposes. As may be seen in Fig. 16, the cam flange has a V-shaped recess 114 within which finger 83 seats when the dial 20 is set in the "off" position. When the dial 20 is rotated counter-clockwise, as viewed from above, to start an operation and to set a desired cooking time, the cam flange 24 is similarly rotated and finger 83 is moved outward and onto the circular portion 115. During the timed cooking operation the cam flange 24 is moved clockwise through operation of the ratchet means hereinbefore described, until it reaches the "off" position and permits finger 83 to again seat in recess 114.

In order to provide for non-automatic operation, as hereinafter described, the cam flange 24 is formed to provide two seats 116 and 117 which are adapted to receive the finger 83 if the dial 20 is turned clockwise from the "off" position, and which respectively establish high and low heat levels in a manner to be described.

The mechanical structure of the apparatus now having been completely described, reference is made to Fig. 3 which shows the electrical connections of the apparatus. In this figure, the base 1 and the head 3 are represented in dotted outline, and it is to be noted that the electrical connections between the base and the head extend within the hollow tower 2. The energizing circuit for the heating unit 9 extends from one supply terminal 118 over conductor 119 through the heating unit 9, thence over conductor 120 to the mechanism within the head 3, thence over conductor 121 to switch 11, and over conductor 122 to the other supply terminal 123. Referring to the connections within the head 3, it should be noted that the heater 30, switch 31 and solenoid winding 32 are serially connected in a branch circuit which is in shunt relation with contacts 61 and 66. It should be noted also that conductor 121 extends to contact 63. When contacts 61 and 63 are closed, the main circuit is completed within head 3, and the pilot lamp 22 is connected across the supply conductors through a current limiting resistor 124. When contacts 61 and 66 are closed, the branch circuit through the thermal switch device 27 and solenoid winding 32 is short circuited, but when those contacts are open, the said branch circuit is rendered operative.

Considering now the automatic operation of the apparatus, and referring particularly to Figs. 8 and 18 to 20, in the "off" condition the controlling switch mechanism is in the condition shown in Fig. 8. In this condition, spring 88 biases member 78 to the position shown, and transverse finger 77 engages finger 94 and holds plate 70 in the position shown. Consequently the switch contacts are open, for contact 63 is held down by button 92 on actuator member 78 against the upward bias of spring blade 62 while contact 66 is held up by button 75 on plate 70 against the downward bias of spring blade 65. The user first places a pressure cooker on the base 1, so that the control valve 14 (Fig. 8) of the cooker is disposed in the opening 12 in engagement with fingers 46. This causes lifting of plate 45 and the entire feeler assembly and switch members mounted thereon without any relative movement between these respective parts. Thus any accumulated tolerance errors that might affect the distance between the top of stem 19 and the arm 76 of the feeler mechanism are substantially avoided. The placement of the pressure cooker on to the base in this manner also causes closing of switch 11 (Fig. 3) and the apparatus is ready for operation. The operator then turns the dial 20 counter-clockwise from its "off" position to a desired setting according to the time for the particular cooking operation, it being understood that different foods require different operating times. The turning of the dial causes outward movement of finger 83, as previously described, and the consequent rocking of actuator member 78 clockwise about its pivot 81, as viewed in Fig. 8, permits the lower spring blade 62 to close contacts 61 and 63 by virtue of the fact that the insulating button 92 is moved out of engagement with the rigid extension 64 of said blade. At the same time, the rocking movement of actuator member 78 terminates the exertion of force of spring 88 acting through extension 93 of said member on plate 70, and in addition lowers finger 94 so that it no longer prevents downward movement of arm 77. The actuator member 78, in the position shown in Fig. 8, in effect, has plate 70 locked against movement by the engagement of finger 94 and transverse finger 77 and that of extension 93 and the body of plate 70. Movement of the dial as above described releases the locking action of actuator 78 thereby permitting movement of plate 70. Actuator member 78 bearing against the cam surface 24 acts as a fixed support for spring 88, and the force exerted thereby causes clockwise or downward movement of plate 70 about its pivot 49 until forward extension 76 engages valve stem 19. Consequently the insulating button 75 moves out of engagement with the rigid extension 67 of spring blade 65 and permits the latter through its downward bias to close contacts 61 and 66. At this time the controlling switch mechanism is in the condition shown in Fig. 18. As may be seen from Fig. 3, the energizing circuit of heating unit 9 is completed through the three contacts 61, 63 and 66, and the branch circuit through the thermal switch device 27 and the solenoid winding 32 is short circuited. Consequently the heating unit 9 is energized at full capacity, and applies maximum heat to the pressure cooker. It should be pointed out that the closing of contacts 61 and 66 precede the closing of contacts 63 and 61 so as to prevent energization of the solenoid until such time as called for.

During initial heating of the pressure cooker, the air is vented through device 15 which then assumes a sealed position and pressure begins to build up within the cooker. As may be seen in Fig. 8, the pressure operates in the direction of the arrows through annular orifice 125 and through the internal orifice 126 to engage the overhanging inner edge of disc 18 in addition to the exposed area of element 19, and when the pressure increases sufficiently the disc rises and lifts the stem-like element 19 through engagement with the shoulder 127 thereof. The sudden increase of area from that of the orifice 126 to that of plate 18 causes a large increase in force with a rapid snap-action raising of valve stem 19 from its position as in Fig. 8 to that in Fig. 19. As may be seen in this figure, when the pressure within the cooker reaches the value set by adjustment of slide member 95, element 19 raises plate 70 against the action of spring 88 whereupon the insulating button 75 engages the rigid extension 67 of spring blade 65 and deflects the latter upward to open contacts 61 and 66. The pressure within the cooker at the instant of upward movement of stem 19 is somewhat less than the full operating pressure selected. In one embodiment, for a full operating pressure of 15 p. s. i., the stem 19 moves up at approximately 8 p. s. i. cooker pressure, while for a full operating pressure of 10 p. s. i., a pressure of approximately 5½ p. s. i. is required to move the stem up. As may be seen in Fig. 3, this removes the short circuit from across the branch circuit including the thermal switch device 27 and solenoid winding 32. Consequently current flows through these elements, and the thermal switch device 27 commences to operate. The advantage of removing the short circuit and starting the timing at some pressure less than full was brought out in the aforementioned Turner et al. application.

The device 27 serves two purposes. It reduces the average wattage input to the heating unit 9, thus reducing the heat output of said unit, and it also intermittently energizes the solenoid winding 32 to effect a timing action through a ratchet movement of control member 23 and dial 20 back to the "off" position. As previously mentioned, device 27 is a cyclic make-and-break device. In its cool condition, switch 31a is closed and current flows through the heater 31 to heat the bimetallic element 30 which flexes until it opens switch 31a. Thereupon the bimetallic element cools, permitting switch 31a to close, and the cycle is repeated. Devices of this type are well known, and as previously stated, a preferred form of such device is shown in the previously mentioned Turner et al. patent. The cyclic opening and closing of switch 31a effects intermittent energization of the solenoid winding 32 to cause the ratchet operation previously described.

During the timed cooking operation, if the pressure within the cooker rises above the desired value, the excess pressure causes stem 19 to rise from disc 18, as indicated by the dot and dash showing in Fig. 19. This has no effect upon the controlling switch mechanism, for it merely causes further opening of contact 66, but it relieves pressure through the space 128 about stem 19 and through the exit port 129. As the pressure recedes to the desired value, stem 19 reseats itself on disc 18.

The pressure in the vessel at which excess pressure venting will occur is determined by the selected position of slide member 95. The force against which the valve stem 19 must work is made up of the tension in spring 88 primarily, and the bias in spring blade 65. Movement of the slide member 95 to its lower position, as shown in Fig. 5, corresponding to the lower operating pressure reduces the force on the valve stem 19 thus decreasing the pressure at which the steam will vent. The spring rates of the switch blade 65 and the spring 88 are carefully controlled to ensure that the excess venting pressure and consequently the selected operating pressure is maintained.

When the control member 23 and dial 20 reach the "off" position, finger 83 is permitted to enter the recess 114 (Fig. 16), and the actuator member 78 is rocked counter-clockwise about its pivot under the force of spring 88. Member 78 no longer acts as a relatively fixed member, for spring 88, acting therethrough about axis 81, causes a relatively great augmenting force to be exerted on plate 70 and then onto valve stem 19. This force is in addition to that exerted through element 89 about axis 49 by spring 88. The actuator member 78 exerts this augmenting downward pressure on plate 70 through extension 93, and the extension 76 of said plate forces stem 19 downward (see Fig. 20), causing disc 18 to move away from shoulder 130 of valve body 16 and thus venting the high pressure steam through the annular orifice defined by the edge of disc 18 and the upper wall of chamber 17. As the pressure in the vessel is reduced the force on forward extension 76 causes further downward movement of valve stem 19 and with it disc 18 until extension 76 of plate 70 reaches the limit of its motion as determined by the "locking" effect on it by actuator 78. The locked position of plate 70 and actuator 78 is identical with that shown in the "off" position in Fig. 8. In this conditioning, the pressure in the cooker holds the valve stem 19 against finger 76 while the disc 18 enters that portion of the chamber 17 that is provided with a larger internal area. The lowering of the pressure level in the cooker thus allows for the more rapid venting of the remaining steam from said cooker. As the pressure decreases still further, valve stem 19 and disc 18 will drop to the position shown in Fig. 8. It should be pointed out that at the instant of movement of the control member 23 to its "off" position actuator member 78 moves sufficiently to cause opening of contacts 61 and 63 through insulating button 92 of said member.

When the pressure is fully vented, the user is apprised of this fact for the movable stem of device 15 will have fallen to its lowermost position, and the user can then remove the cooker from the control stand. Removal of the cooker causes opening of the switch 11.

That portion of the control mechanism which includes plates or levers 45, 70 and 78, plate 89 and spring 88 is considered particularly advantageous from the standpoint of novelty of arrangement, multiplicity of function and overall manufacturability and economy for the multiplicity of functions involved. Reference may be had to the simplified illustrations of Figs. 21 and 22 for a fuller understanding of the manner in which a plurality of carefully calibrated resisting forces are applied to the valve stem during initial cooking, cooking under pressure, excess pressure venting and finally automatic venting of pressure at the end of the timed cooking period. In Fig. 21 the various levers are shown as they are disposed during initial heating or during the timed cooking period. In this condition, actuator 78 is effectively fixed by bearing against cam surface 24; this therefore acts as a stationary support for the right-hand end of spring 88. Thus the tension of spring 88 acting through plate 89 is transmitted as a torque around fixed axis 49 to plate 70 and thence to valve stem 19. The tension in spring 88 is set at approximately 510 g. and the force on the valve stem during the initial heating up period for 15 p. s. i. operating pressure is approximately 85 g. When the valve stem rises at the predetermined value of cooking pressure, the pressure on the stem increases to approximately 105 g. (This of course includes the additional bias of switch blade 65, not shown.) To vent any excess pressure the total upward force on the stem must exceed the 105 g. value.

If the plate 89 is in its lower position for 10 p. s. i. operational pressure, the resisting force on the valve stem is decreased, since the spring 88 is in the dotted line position and the moment arm with respect to axis 49 is reduced.

Figure 22:
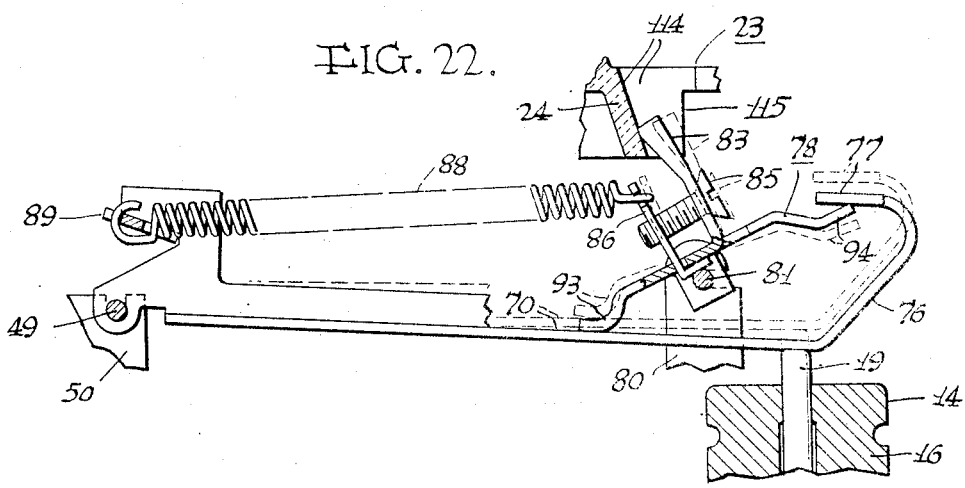

In Fig. 22, the levers assume the position for the venting of the cooker. The cam surface 24 has been removed by the advance of the timer, so that actuator 78 is free to rotate until it engages plate 70. At this instant, as shown in the dotted line position, the tension in spring 88 is transmitted as a torque about axis 81 through actuator 78 to plate 70. The force greatly augments that still being applied through the other end of spring 88 and plate 89. The total force on stem 19 for the 15 p. s. i. setting of plate 89 is approximately 375 g. Interengagement of finger 94, of actuator 78 and transverse finger 77 of plate 70 on reduction of pressure in the cooker and consequent lowering of stem 19 under the load applied thereto through plate 70 (as shown in the solid line position of Fig. 22) prevents further movement of plate 70, and the stem merely bears against plate 70 until the cooker pressure is substantially reduced.

It will be observed that plate 45 (see Figs. 13 and 18) which serves as the pivotal support for actuator 78 is arranged for pivotal movement about pin 49. The fingers 46 of the plate bear against the top of valve body 14, and the amount of movement of the plate is determined by the vertical nominal dimensions and accumulated tolerances of the valve, the cooker, the heater and its support, the control column 2, and the distance between 49 and the bottom of the control head 7. The positioning of plate 45 does not effect the relative positioning of switches 63 and 61 and 66 and 61, for the latter is assembled directly thereon and move as the plate 45 moves; it is therefore only the relative angular displacement of plates 70 and 45 that need be concerned with and these are controlled by the predetermined displacement of the valve stem 19. Actuator 78, as mentioned previously, is pivoted on plate 45 and therefore insures that relative displacements are the only ones of critical importance. It is pointed out that the contour of the "off" detent, as viewed in Fig. 8, is substantially arcuate with respect to axis 49 as a center, so that the position and action of cam follower surface 83 is independent of the absolute vertical disposition of axis 81. It is of course possible to similarly contour the remaining active race of camming flange 24 to make the vertical displacement of actuator 78 absolutely independent of the position it takes on said camming flange.

From the foregoing description, it will be seen that the user has only to place the cooker on the control stand, set the dial, and remove the cooker after the cooking operation is completed. The apparatus performs all of the necessary functions without any attention on the part of the user. Further, it is to be pointed out that the user can place the cooker on the stand and into correct position for automatic operation with maximum ease. The recess or opening 12 in the central forward portion of the control head 3 is inherently suggestive of the mode of assembly of the cooker and stand. The outer contour of the valve cooperates with the side walls of opening 12, and when the vessel is in its correct operative position for automatic operation, the valve engages the rear wall of the opening. The fingers 46 and plate 45 easily ride atop the valve body to adjust its associated mechanism to the vertical position of the valve and the arrangement leaves the valve stem 19 positioned for its subsequent cooperative action with plate 76. It will be noted that at the top front of the opening 12 the control head is relieved to permit removal of the vessel if by chance such removal from the control stand is effected during an automatic cooking operation. In such cases the valve will vent the pressure in the vessel by movement of valve stem 19 as in the dotted line portion of Fig. 19.

As previously mentioned, the apparatus is also adapted to be used in a non-automatic manner as a source of heat. It has been found of advantage to arrange the apparatus so that the user can perform certain cooking operations which are adjunct to pressure cooking. Thus browning of meats before pressure cooking is a well established cooking procedure. In this type of operation any cooking vessel may be used, for it is only during a fully automatic operation that there exists the prescribed cooperation between control valve 14 and the cooperating fingers in opening 12 of the control head 3.

In this embodiment two heats for this non-automatic operation are provided: a high heat corresponding to full energization of heating unit 9 and a low heat corresponding to intermittent energization of heating unit 9 at a predetermined average wattage as controlled by cyclic operation of thermal timer 27.

For such operation, instead of turning dial 20 counter-clockwise, which would provide a timed automatic pressure cooking operation, the user turns the dial clockwise sufficiently to cause finger 83 (Fig. 16) to seat either at position 116 or at position 117 of the cam flange 24, depending upon whether high or low heat is desired. In either position, the outward movement of finger 83 causes closure of switch contacts 61 and 63 to effect energization of the heating unit 9. With the finger 83 at position 116, the controlling switch mechanism is in the condition shown in Fig. 23, and contacts 61 and 66 are also engaged. Therefore the thermal switch device 27 is short circuited and the heating unit 9 is continuously energized, thus providing full wattage input to said unit for operation at the high heat level. However, with the finger 83 in position 117, the actuator member 78 is rocked to the dot and dash position shown in Fig. 23, and the insulating button 92 engages the rigid extension 67 of spring blade 65 and flexes the latter upward sufficiently to open contacts 61 and 66. Therefore the short circuit is removed from the thermal switch device 27, and the latter effects intermittent energization of heating unit 9, thus supplying a lower average wattage input to said unit and causing the same to operate at a lower heat level. In this condition of the apparatus, the solenoid winding 32 is intermittently energized but the ratchet mechanism is ineffective due to the fact that the ratchet flange 25 (Fig. 16) has a smooth or toothless section 130, and at this time the pawl 44 is adjacent the smooth area and although the pawl is actuated by the intermittent energization of the solenoid it cannot actuate the controlling member 23. Therefore no timing takes place, and the apparatus simply continues to operate until the user turns the dial 20 to the "off" position.

Although a preferred embodiment of the invention has been illustrated and described it will be apparent that the invention is not limited thereto but contemplates such modifications and other embodiments as may occur to those skilled in the art.

We claim:

1. Apparatus for automatic control of a pressure cooker equipped at its upper part with a pressure-operable valve having a projecting element to enable venting of the cooker, said apparatus comprising: a stand including a base to receive said cooker, a standard extending upward from said base, and a hollow head at the top of said standard having an opening to receive said valve; an electrical heating unit on said base to heat said cooker when the latter is in place thereon; switch means in said head electrically connected to said heating unit through said standard and adapted to control the energization of said unit; timing means in said head operable to time a cooking operation; a manually-adjustable member on said head having an "off" position and different time-setting positions; means in said head controlled by said member to effect operation of said switch means to initiate energization of said heating unit; means in said head controlled by said member to set the desired time of a cooking operation; means operable by said valve element to initiate operation of said timing means when the pressure in said cooker reaches a certain value; and means controlled by said timing means to actuate both said switch means and said valve element, at the end of the timed interval determined by the setting of said member, to deenergize said heating unit and to effect venting of the pressure from said cooker.

2. Apparatus for automatic control of a pressure cooker equipped at its upper part with a pressure-operable valve having a projecting element to enable venting of the cooker, said apparatus comprising: a stand including a base to receive said cooker, a standard extending upward from said base, and a hollow head at the top of said standard having an opening to receive said valve; an electrical heating unit on said base to heat said cooker when the latter is in place thereon; switch means in said head electrically connected to said heating unit through said standard and adapted to control the energization of said unit; timing means in said head operable to time a cooking operation; a manually-adjustable member on said head having an "off" position and different time-setting positions; means controlled by said member to effect operation of said switch means to initiate energization of said heating unit; means controlled by said member to set the desired time of a cooking operation; manually adjustable means for selecting one of a plurality of cooking pressures at which it is desired that said timing means shall commence operation; means operable by said valve element to initiate operation of said timing means when the pressure in said cooker reaches the selected value; and means controlled by said timing means to actuate both said switch means and said valve element, at the end of the timed interval determined by the setting of said member, to deenergize said heating unit and to effect venting of the pressure from said cooker.

3. Apparatus for automatic control of a pressure cooker equipped at its upper part with a pressure-operable valve having a projecting element to enable venting of the cooker, said apparatus comprising: a stand including a base to receive said cooker, a standard extending upward from said base, and a hollow head at the top of said standard having an opening to receive said valve; an electrical heating unit on said base to heat said cooker when the latter is in place thereon; a pivoted spring-biased assembly within said head engageable by said valve through said opening; switch means on said assembly electrically connected to said heating unit through said standard and adapted to control the energization of said unit; timing means in said head operable to time a cooking operation; a manually-adjustable member on said head having an "off" position and different time-setting positions; means controlled by said member to effect operation of said switch means to initiate energization of said heating unit; means controlled by said member to set the desired time of a cooking operation; means on said assembly operable by said valve element to initiate operation of said timing means when the pressure in said cooker reaches a certain value; and means controlled by said timing means to actuate both said switch means and said valve element, at the end of the timed interval determined by the setting of said member, to deenergize said heating unit and to effect venting of the pressure from said cooker.

4. In an apparatus for automatic control of a pressure cooker equipped with a pressure-operable valve having a projecting element; a stand including a base to receive said cooker, a standard extending upward from said base, and a hollow head at the top of said standard; an electrical heating unit on said base to heat said cooker when the latter is placed thereon; switch means within said head electrically connected to said heating unit through said standard for controlling the energization of said unit; a first pivoted member within said head engageable by said valve element and having switch actuating means; a second pivoted member within said head engageable with said first member and also having switch actuating means; biasing spring means within said head inter-connecting said members; and manually-operable means on said head for actuating said second member.

5. In an apparatus for automatic control of a pressure cooker equipped with a pressure-operable valve having a projecting element; a stand including a base to receive said cooker, a standard extending upward from said base, and a hollow head at the top of said standard; an electrical heating unit on said base to heat said cooker when the latter is placed thereon; switch means within said head electrically connected to said heating unit through said standard for controlling the energization of said unit; a first pivoted member within said head engageable by said valve element and having switch actuating means; a second pivoted member within said head engageable with said first member and also having switch actuating means; biasing spring means inter-connecting said members; a manually-rotatable knob on said head; and cam means connected to said knob and engaging said second member for actuating the same.

6. In an apparatus for automatic control of a pressure cooker equipped with a pressure-operable valve having a projecting stem to enable venting of the cooker and for transmitting pressure intelligence from within the cooker, a first pivoted lever engageable by said stem for receiving intelligence from said cooker and for transmitting forces to said stem, a helical tension spring having one end arranged to exert a force of predetermined magnitude through said lever onto said stem, a manually settable member having a cam surface, and a second lever engageable with said surface and connected to the other end of said spring whereby the spring urges said second lever toward said surface, said second lever having a portion engageable with said first lever but held out of engagement therewith by said cam surface during the cooking operation, said member being movable to a venting position wherein said surface permits said second lever to engage said first lever to apply an augmenting force thereto and to effect movement of said stem to venting position.

7. In an apparatus for automatic control of a pressure cooker equipped with a pressure-operable valve having a projecting stem to enable venting of the cooker and for transmitting pressure intelligence from within the cooker, a first pivoted lever engageable by said stem for receiving intelligence from said cooker and for transmitting forces to said stem, a helical tension spring having one end arranged to exert a force of predetermined magnitude through said lever onto said stem, a manually settable member having a cam surface, and a second lever engageable with said surface and connected to the other end of said spring whereby the spring urges said second lever toward said surface, said second lever having a portion engageable with said first lever but held out of engagement therewith by said cam surface during the cooking operation, said member being movable to a venting position wherein said surface permits said second lever to engage said first lever to apply an augmenting force thereto and to effect movement of said stem to venting position, said levers having interengageable portions which limit displacement of said first lever and prevent movement of said stem beyond a predetermined venting position.

8. In an apparatus for automatic control of a pressure cooker equipped with a pressure-operable valve having a projecting stem to enable venting of the cooker and for transmitting pressure intelligence from within the cooker, a first pivoted lever engageable by said stem for receiving intelligence from said cooker and for transmitting forces to said stem, a fulcrumed element engaging said lever in offset relation to the pivot thereof and having two stable positions, a helical spring having one end connected to said element to exert different predetermined forces through said lever onto said stem according to the position of said element, a manually settable member having a cam surface, and a second lever engageable with said surface and connected to the other end of said spring whereby the spring urges said second lever toward said surface, said second lever having a portion engageable with said first lever but held out of engagement therewith by said cam surface during the cooking operation, said member being movable to a venting position wherein said surface permits said second lever to engage said first lever to apply an augmenting force thereto and to effect movement of said stem to venting position.

9. In an apparatus of the class described, a feeler and switch mechanism comprising a spring-biased pivoted plate having extending feeler finger means, switch means carried by said plate, a second plate pivotally mounted on the same pivot as said first plate, said second plate having extending feeler finger means and also having a switch-operating extension cooperable with said switch means, an actuator member pivotally supported by said first plate and having extensions cooperable with said switch means and with said second plate, biasing spring means interconnected between said second plate and said member, and manually-adjustable power-driven cam means cooperable with said member to control movement of the latter by said spring means.

10. In an apparatus of the class described, a hollow control head comprising upper and lower halves, means fixedly securing the lower half of said head, means removably securing the upper half of said head to the lower half thereof, and a feeler and switch mechanism within said head comprising a spring-biased pivoted plate having extending feeler finger means, switch means carried by said plate, a second plate pivotally mounted on the same pivot as said first plate, said second plate having extending feeler finger means and also having a switch-operating extension cooperable with said switch means, an actuator member pivotally supported by said first plate and having extensions cooperable with said switch means and with said second plate, biasing spring means interconnected between said second plate and said member, and manually-adjustable power-driven cam means cooperable with said member to control movement of the latter by said spring means.

11. In an apparatus of the class described, a feeler and switch mechanism comprising a spring-biased pivoted plate having extending feeler finger means, switch means carried by said plate, a second plate pivotally mounted on the same pivot as said first plate, said second plate having extending feeler finger means and also having a switch-operating extension cooperable with said switch means, an actuator member pivotally supported by said first plate and having extensions cooperable with said switch means and with said second plate, a helical tension spring having one end connected to said member, means operatively connecting the other end of said spring to said second plate, said last means comprising an element mounted on said second plate for movement to either of two positions to shift the axis of the spring, so as to change the moment of force of the spring about the pivot of said second plate, and manually-adjustable power-driven cam means cooperable with said member to control movement of the latter by said spring.

12. In an apparatus of the class described, a hollow control head comprising upper and lower halves, means fixedly securing the lower half of said head, means removably securing the upper half of said head to the lower half thereof, and a feeler and switch mechanism within said head comprising a spring-biased pivoted plate having extending feeler finger means, switch means carried by said plate, a second plate pivotally mounted on the same pivot as said first plate, said second plate having extending feeler finger means and also having a switch-operating extension cooperable with said switch means, an actuator member pivotally supported by said first plate and having extensions cooperable with said switch means and with said second plate, a helical tension spring having one end connected to said member, means operatively connecting the other end of said spring to said second plate, said last means comprising an element mounted on said second plate for movement to either of two positions to shift the axis of the spring so as to change the moment of force of the spring about the pivot of said second plate, a manual element on the upper half of said head engaging said first element to shift the same, and manually-adjustable power-driven cam means cooperable with said member to control movement of the latter by said spring.

13. In an apparatus of the class described, a hollow control head comprising upper and lower halves, means fixedly securing the lower half of said head, means removably securing the upper half of said head to the lower half thereof, and a feeler and switch mechanism within said head comprising a spring-biased pivoted plate having extending feeler finger means, switch means carried by said plate, a second plate pivotally mounted on the same pivot as said first plate and provided with a pair of spaced V-shaped notches offset from said pivot, said second plate having extending feeler finger means and also having a switch-operating extension cooperable with said switch means, an actuator member pivotally supported by said first plate and having extensions cooperable with said switch means and with said second plate, a helical tension spring having one end connected to said member, means operatively connecting the other end of said spring to said second plate, said last means comprising an element seated in said notches for movement to either of two positions to shift the axis of the spring so as to change the moment of force of the spring about the pivot of said second plate, and a manual slide element on the upper half of said head engaging said first element to shift the same.

14. In an apparatus of the class described, switch means comprising a plurality of spring blades, a pivoted plate adjacent said switch means having an extending actuating finger and also having an extending finger engageable with one of said blades, a pivoted member cooperatively associated with said plate and having an extending finger engageable with another of said blades, biasing spring means interconnected between said plate and said member, and manually-adjustable power-driven cam means cooperable with said member to control movement of the latter by said spring means.

15. In an apparatus of the class described, switch means comprising a plurality of spring blades, a pivoted plate adjacent said switch means having an extending actuating finger and also having an extending finger engageable with one of said blades, a pivoted member cooperatively associated with said plate and having an extending finger engageable with another of said blades, a helical tension spring having one end connected to said member, means operatively connecting the other end of said spring to said plate, said last means comprising an element mounted on said plate for movement to either of two positions to shift the axis of the spring so as to change the moment of force of the spring about the pivot of said plate, and manually-adjustable power-driven cam means cooperable with said member to control movement of the latter by said spring.

16. In an apparatus of the class described, a stationary yoke, a stud extending upward therefrom, a manually settable member rotatably supported by said stud and having a cam surface, a first plate below said yoke pivoted at one end and having feeler finger means at its opposite end, a helical compression spring between said plate and said yoke for biasing said plate, seating means for said spring on said plate and said yoke, switch means carried by said plate, a second plate pivotally mounted on the same pivot as said first plate, said second plate having extending feeler finger means and also having a switch-operating extension cooperable with said switch means, an actuator member pivotally supported by said first plate and having extensions cooperable with said switch means, said second plate, and said cam surface, and biasing spring means interconnected between said second plate and said actuator member.

17. In an apparatus of the class described, a stationary yoke, a stud extending upward therefrom, a manually settable member rotatably supported by said stud and having a cam surface, a first plate below said yoke pivoted at one end and having feeler finger means at its opposite end, a helical compression spring between said plate and said yoke for biasing said plate, seating means for said spring on said plate and said yoke, switch means carried by said plate, a second plate pivotally mounted on the same pivot as said first plate, said second plate having extending feeler finger means and also having a switch-operating extension cooperable with said switch means, an actuator member pivotally supported by said first plate and having extensions cooperable with said switch means, said second plate, and said cam surface, and biasing spring means interconnected between said second plate and said actuator member, at least a portion of said cam surface that cooperates with said actuator member being substantially arcuate with respect to said pivot as a center.

18. In an apparatus of the class described, a stationary yoke, a stud extending upward therefrom, a manually settable member rotatably supported by said stud and having a cam surface, a first plate below said yoke pivoted at one end and having feeler finger means at its opposite end, a helical compression spring between said plate and said yoke for biasing said plate, seating means for said spring on said plate and said yoke, switch means carried by said plate, a second plate pivotally mounted on the same pivot as said first plate, said second plate having extending feeler finger means and also having a switch-operating extension cooperable with said switch means, an actuator member pivotally supported by said first plate and having extensions cooperable with said switch means, said second plate, and said cam surface, and biasing spring means interconnected between said second plate and said actuator member, said second plate and said actuator member having interengageable portions which limit displacement of said second plate under the impetus of forces exerted by said spring means.

19. In an apparatus for automatic control of a pressure cooker equipped at its upper part with a pressure-operable valve having a projecting element; a stand including a base to receive said cooker, a standard extending upward from said base, and a hollow head at the top of said standard having an opening to receive said valve, said opening having side walls and a back wall which index the position of the pressure cooker on said base; an electrical heating unit on said base to heat said cooker; a pivoted plate within said head spring-biased downwardly and having a pair of spaced fingers arranged for engagement with said valve when the latter is in said opening; switch means carried by said plate and electrically connected to said heating unit through said tower for controlling the energization of said unit; and means including a feeler element interposed between said fingers for engagement by said valve element to actuate said switch means in response to movement of the valve element.

20. In an apparatus for control of a pressure cooker equipped at its upper part with a pressure condition responsive valve having a fixed body and movable projecting element, heating means normally stationary with respect to said apparatus for placement of said cooker thereon, a movably supported member biased toward said valve body to engage the same and be positioned thereby, a second movably supported member biased toward said valve element to engage the same, and switch means mounted on said first member and controlled by movements of predetermined magnitude of said second member relative to said first member under the impetus of said valve element for controlling the operation of said heating means irrespective of the initial positioning of said first member.

21. Apparatus for automatic control of a pressure cooker equipped at its upper part with a pressure operable valve having a movable projecting element movable in one direction in response to increase of pressure within the cooker and movable in the opposite direction to vent the cooker, said apparatus comprising: a stand including a base to receive the cooker, a standard extending upward from said base, and a hollow control head at the top of said standard; an electrical heating unit on said base to heat said cooker when the latter is in place thereon; normally-inoperative means within said control head interconnected with said heating unit through said standard to reduce the heat output of the heating unit; a spring-biased pivoted feeler member within said control head engageable by said valve element and operable by movement thereof in the first-mentioned direction in response to attainment of a predetermined pressure in said cooker; means operable by said feeler member to render said heat-reducing means operative; and means operable at the end of the cooking operation to cause said feeler member to apply a force to said valve element in the second-mentioned direction to vent the cooker.

22. Apparatus for automatic control of a pressure cooker equipped at its upper part with a pressure operable valve having a movable projecting element movable in one direction in response to increase of pressure within the cooker and movable in the opposite direction to vent the cooker, said apparatus comprising: a stand including a base to receive the cooker, a standard extending upward from said base, and a hollow control head at the top of said standard; an electrical heating unit on said base to heat said cooker when the latter is in place thereon; normally-inoperative means within said control head interconnected with said heating unit through said standard to time a cooking operation; a spring-biased pivoted feeler member within said control head engageable by said valve element and operable by movement thereof in the first-mentioned direction in response to attainment of a predetermined pressure in said cooker; means operable by said feeler member to render said timing means operative; and means operable at the end of the timed cooking operation to cause said feeler member to apply a force to said valve element in the second-mentioned direction to vent the cooker.

23. Apparatus for automatic control of a pressure cooker equipped at its upper part with a pressure operable valve having a movable projecting element movable in one direction in response to increase of pressure within the cooker and movable in the opposite direction to vent the cooker, said apparatus comprising: a stand including a base to receive the cooker, a standard extending upward from said base, and a hollow control head at the top of said standard; an electrical heating unit on said base to heat said cooker when the latter is in place thereon; switch means within said control head interconnected with said heating unit through said standard to control the energization of the heating unit; a manually-adjustable member on said control head having an "off" position and different time setting "on" positions; means within said control head controlled by said member to effect closure of said switch means when said member is in an "on" position; normally-inoperative timing means within said control head to move said member to the "off" position; a spring-biased pivoted feeler member within said control head engageable by said valve element and operable by movement thereof in the first-mentioned direction in response to attainment of a predetermined pressure in said cooker; means operable by said feeler member to render said timing means operative; and means operable when said first-mentioned member reaches the "off" position to cause said feeler member to apply a force to said valve element in the second-mentioned direction to vent the cooker.

24. Apparatus for automatic control of a pressure cooker equipped at its upper part with a pressure operable valve having a movable projecting element movable in one direction in response to increase of pressure within the cooker and movable in the opposite direction to vent the cooker, said apparatus comprising: a stand including a base to receive the cooker, a standard extending upward from said base, and a hollow control head at the top of said standard; an electrical heating unit on said base to heat said cooker when the latter is in place thereon; a first switch within said control head electrically connected to said heating unit through said standard and adapted to control the energization of the heating unit; electrically-operable timing means within said control head interconnected with said heating unit through said standard; a manually-adjustable member on said control head having an "off" position and different time-setting positions; means controlled by said member to effect operation of said switch to initiate energization of said heating unit; a second switch within said control head normally rendering said timing means inoperative; a feeler member within said control head engageable by said valve element and arranged to actuate said second switch in response to movement of the valve element in the first-mentioned direction upon attainment of a predetermined pressure in said cooker, the actuation of said second switch initiating operation of said timing means; and means operable at the end of the timed cooking operation to actuate said first switch and to cause said feeler member to apply a force to said valve element in the second-mentioned direction, whereby to deenergize said heating unit and to vent the cooker.

25. Apparatus according to claim 24, including a pivoted feeler member having means thereon to actuate said second switch, a pivoted member controlled by the manually-adjustable member and engageable with said feeler member and also having means to actuate said first switch, and biasing spring means interconnecting said pivoted members.

26. In an apparatus for automatic control of a pressure cooking operation, a pressure cooker equipped at its upper part with means responsive to pressure conditions within said cooker, a stand including a base to receive said cooker, an electrical heating unit on said base to heat said cooker when the latter is placed thereon, a standard extending upward from said base, a hollow control head supported at the top of said standard, control mechanism entirely contained within said hollow control head, said control mechanism including timing means operable to time a cooking operation, switch means electrically connected to said heating unit through said standard to control the energization of said unit, manually adjustable means on said control head for selecting one of a plurality of cooking pressures at which it is desired that the cooker shall operate, a manually adjustable member on said head having an "off" position and different time-setting positions so as to set the desired time length of the pressure cooking operation and to simultaneously initiate the energization of the heating unit through operation of said switch means, and means operable by said pressure-responsive means to initiate operation of said timing means.

27. In an apparatus for automatic control of a pressure cooking operation, a pressure cooker equipped at its upper part with means responsive to pressure conditions within said cooker, a stand including a base to receive said cooker, an electrical heating unit on said base to heat said cooker when the latter is placed thereon, a standard extending upward from said base, a hollow control head supported at the top of said standard, control mechanism entirely contained within said hollow control head, said control head comprising upper and lower halves, securing means for holding said lower half atop said standard, fastening means removably securing the upper half of said control head to said lower half, whereby removal of said fastening means permits complete exposure of the control mechanism, said control mechanism including timing means operable to time a cooking operation, switch means electrically connected to said heating unit through said standard to control the energization of said unit, a manually adjustable member on said head having an "off" position and different time-setting positions so as to set the desired time length of the pressure cooking operation and to simultaneously initiate the energization of the heating unit through operation of said switch means, and means operable by said pressure-responsive means to initiate operation of said timing means.

References Cited in the file of this patent

UNITED STATES PATENTS

| | | |
|---|---|---|
| 1,681,157 | Eggleston | Aug. 14, 1928 |
| 1,985,100 | Kuhn et al. | Dec. 18, 1934 |
| 1,993,956 | Browning | Mar. 12, 1935 |
| 2,369,932 | Allen | Feb. 20, 1945 |